United States Patent
Baro Pujol

(10) Patent No.: US 11,053,072 B2
(45) Date of Patent: Jul. 6, 2021

(54) SUPPORTING STRUCTURE FOR A SLIDING RAIL

(71) Applicant: Juan Carlos Baro Pujol, Barcelona (ES)

(72) Inventor: Juan Carlos Baro Pujol, Barcelona (ES)

( * ) Notice: Subject to any disclaimer, the term of this patent is extended or adjusted under 35 U.S.C. 154(b) by 0 days.

(21) Appl. No.: 15/769,569

(22) PCT Filed: Nov. 2, 2016

(86) PCT No.: PCT/ES2016/070773
§ 371 (c)(1),
(2) Date: Apr. 19, 2018

(87) PCT Pub. No.: WO2017/077155
PCT Pub. Date: May 11, 2017

(65) Prior Publication Data
US 2018/0312333 A1 Nov. 1, 2018

(30) Foreign Application Priority Data

Nov. 5, 2015 (ES) .............................. ES201531595

(51) Int. Cl.
*B65G 1/02* (2006.01)
*A47B 96/02* (2006.01)
*B65G 1/08* (2006.01)

(52) U.S. Cl.
CPC ............ *B65G 1/026* (2013.01); *A47B 96/021* (2013.01); *B65G 1/02* (2013.01); *B65G 1/023* (2013.01); *B65G 1/08* (2013.01)

(58) Field of Classification Search
CPC ........ A47B 55/02; A47B 47/02; B65G 1/026; B65G 1/04; B65G 1/06
See application file for complete search history.

(56) References Cited

U.S. PATENT DOCUMENTS

| | | | | |
|---|---|---|---|---|
| 3,154,028 A | * | 10/1964 | Hamilton | ............... A47B 55/02 108/186 |
| 3,659,722 A | * | 5/1972 | Carroll | ................. A47B 73/002 211/106 |

(Continued)

FOREIGN PATENT DOCUMENTS

| | | |
|---|---|---|
| CH | 697968 B1 | 4/2009 |
| ES | 2051680 T1 | 7/1994 |

(Continued)

OTHER PUBLICATIONS

International Search Report for corresponding International PCT application No. PCT/ES2016/070773, dated May 11, 2017.

*Primary Examiner* — Stanton L Krycinski
(74) *Attorney, Agent, or Firm* — Notaro, Michalos & Zaccaria P.C.

(57) ABSTRACT

Supporting structure for sliding rail that uses one or more identical modules, stacked longitudinally and supported on the beams of the conventional compact palletisation facility, on which the tracks for the chains of the sliding rail are subsequently mounted, each of these modules including, in turn, a quadrangular mesh supported on several ribs that may be fixed or telescopic, and which has, on its upper part, supporting rods for the rails for the chain. The supporting structure for sliding rail that is presented affords the main advantage of enabling any existing compact "drive-in" palletisation structure to be used and adapted to operate with "flow-rail" sliding rails or similar, dispensing with the need for custom adaptations, as well as achieving greater rigidity, better inner fitting, greater resistance to deformation and smoother operation of the sliding rail.

5 Claims, 11 Drawing Sheets

(56) References Cited

U.S. PATENT DOCUMENTS

| | | | |
|---|---|---|---|
| 4,168,780 A | 9/1979 | Parrott | |
| 4,541,518 A | 9/1985 | Palazzolo et al. | |
| 4,702,380 A * | 10/1987 | Herman | A47F 5/083 |
| | | | 211/181.1 |
| 4,884,702 A * | 12/1989 | Rekow | A47F 5/01 |
| | | | 211/90.02 |
| 5,312,004 A | 5/1994 | Krummell et al. | |
| 5,769,248 A * | 6/1998 | Johnson | A47F 5/0807 |
| | | | 211/103 |
| 6,299,001 B1 * | 10/2001 | Frolov | A47F 5/01 |
| | | | 211/106 |
| 6,643,900 B2 * | 11/2003 | Jahrling | A47B 55/02 |
| | | | 24/336 |
| 7,314,143 B1 * | 1/2008 | Johnson | A47B 57/20 |
| | | | 211/103 |
| 7,357,262 B2 * | 4/2008 | Fratilla | A47B 47/02 |
| | | | 211/117 |
| 8,540,088 B2 * | 9/2013 | Brasher | A47F 5/083 |
| | | | 211/106 |
| 9,271,584 B1 * | 3/2016 | Weinstein | A47F 5/135 |
| 10,058,172 B2 * | 8/2018 | Staib | A47F 5/13 |
| 2002/0159865 A1 | 10/2002 | Konstant | |
| 2004/0065632 A1 * | 4/2004 | Ondrasik | A47F 5/005 |
| | | | 211/184 |
| 2004/0084392 A1 * | 5/2004 | Richter | A47F 5/0838 |
| | | | 211/59.3 |
| 2005/0279041 A1 * | 12/2005 | Staples | A47B 55/02 |
| | | | 52/506.06 |
| 2006/0091092 A1 * | 5/2006 | Vosbikian | A47F 5/01 |
| | | | 211/87.01 |
| 2006/0180557 A1 * | 8/2006 | Weinstein | A47B 55/02 |
| | | | 211/40 |
| 2015/0150387 A1 * | 6/2015 | Turner | A47F 1/121 |
| | | | 211/59.2 |

FOREIGN PATENT DOCUMENTS

| | | |
|---|---|---|
| ES | 2186964 T3 | 8/1999 |
| ES | 2133792 T3 | 9/1999 |
| ES | 2150799 T3 | 12/2000 |
| ES | 2176831 T3 | 12/2002 |
| ES | 2199730 T3 | 3/2004 |

* cited by examiner

SUPPORTING STRUCTURE FOR A SLIDING RAIL

The present description relates, as its title indicates, to a supporting structure for a sliding rail of the type known as "flow-rail" or similar that can be mounted in conventional compact palletisation facilities, for storing pallets, containers or boxes, also known as "drive-in" facilities, and which uses modules stacked longitudinally and supported on the beams of the conventional compact palletisation facility, on which the tracks for the chains of the sliding rail are subsequently mounted.

FIELD OF THE INVENTION

The invention relates to the field of mounting accessories for "flow-rail" type facilities with sliding rails for pallets, containers or boxes used in compact palletisation or "drive-in" type storage and/or distribution facilities.

BACKGROUND OF THE INVENTION

At present facilities for the storage and/or distribution of pallets, containers or boxes, of the compact palletisation or "drive-in" type, consisting of a spatial structure of beams and cross-beams on which the pallets, containers or boxes are supported, are widely known and used. Numerous examples of these structures can be found amongst which are patents ES2176831 "Storage racking, especially for the storage of loaded pallet", ES2133792"Port facility", ES2186964"Storage racking for pallets or bulk goods with standardised supporting surface", ES2150799"Warehouse racking for the storage of loaded pallets" or ES2199730"Storage system for pallets".

These facilities require the use of machinery to stack and remove pallets and the utilization of space is problematic due to the fact that access to the elements stored at the back of the structure requires leaving side access aisles free for the said machinery, with the consequent waste of storage space.

Attempts have been made to mitigate this problem with facilities that do not require side spaces for machinery, by means of sliding on rollers or sliding chains, known as "flow-rail" facilities. Numerous examples of this type of facility with rollers can be found in patents U.S. Pat. No. 4,168,780A "Flow rail rack" or U.S. Pat. No. 4,541,518A "Material flow rail", or with sliding chains, in patents CH697968 "Binario di supporto e guida per palette e contenitori" or ES2051680 "Platform support tracks as well as insertion platform with platform support tracks and transportation rail", that use flat-type sliding chains for the elements, which, on the one hand improve movement and make it smoother and, on the other, enable sequential depth storage, with a better utilisation of storage space.

However, even these latter solutions have the problem of requiring a specifically-built storage facility, which means that they are not compatible with conventional drive-in type facilities and these have to be dismantled previously, with the enormous economic cost and loss of investment that this entails.

DESCRIPTION OF THE INVENTION

To overcome the problems that currently exist in adapting conventional compact "drive-in" palletisation facilities to operate with "flow-rail" sliding rails or similar, the supporting structure for sliding rail that is the subject matter of this invention has been devised, which uses one or several identical modules, stacked longitudinally that, in turn, each comprise a mesh with a quadrangular format, formed by a plurality of rods arranged perpendicularly and welded together forming a fixed unit, supported on several ribs that, on its upper part, has supporting rods for the rails on which, subsequently, the chain will slide, the said rods being arranged perpendicularly to the ribs, and distributed in pairs.

The supporting rods for the rails have a larger diameter than the support and tie rods that form the mesh.

The ribs can be of a fixed length or they can be telescopic, of an adjustable length.

The fixed-length ribs are formed as a single piece, comprising a central element, the length of which is notably greater than the rest of the dimensions, finished at both ends with flat terminations, the said flat terminations having several emerging protuberances and one or several perforations, envisaged for eliminating dirt.

The central element of the fixed ribs is formed by a flat plate shaped as a open profile on its upper part, and more specifically, by a flat plate shaped as an open profile with a section selected from the group formed by: U-shaped, V-shaped, semicircular, formed with two parts that run parallel to each other and two U-shaped parts, formed with two parts that run parallel to each other and two V-shaped parts, or formed with two parts that run parallel to each other and a semicircular part.

The telescopic ribs comprise a central body and two terminations that can move longitudinally in relation to the said central body, the said central body being formed by a flat plate shaped as an open profile on its upper part, and more specifically, formed by a flat plate shaped as an open profile with a section selected from the group consisting of: U-shaped, V-shaped, semi-circular, formed with two parts that run parallel to each other and two U-shaped parts, formed with two parts that run parallel to each other and two V-shaped parts, or formed with two parts that run parallel to each other and a semi-circular part.

The terminations of the telescopic ribs are formed as one single piece with a flat part and a part whose section coincides with the section of the central body, partially inserted into the said central body and linked to it by means of at least two tabs folded over the side walls of the central body.

In addition, on the flat part of the terminations of the telescopic ribs there are several emerging protuberances and one or several perforations, envisaged for eliminating dirt The telescopic ribs are arranged in such a way under the mesh that one of the supporting rods that forms it acts as an external travel stop and another as an internal travel stop for the tabs, and hence for the terminations in their movement in relation to the central body.

It is important to highlight the use of the supporting structure for sliding rail described in the afore-indicated paragraphs, for storing, moving or handling containers, pallets, boxes or similar.

Advantages of the Invention

The supporting structure for sliding rail that is presented affords numerous advantages over the devices currently available, the most important of these being that it enables any existing compact "drive-in" palletisation structure to be used and adapted to operate with "flow-rail" sliding rails or similar, allowing its modernisation and improvement.

Another important advantage is that the existing compact "drive-in" palletisation structure is used to mount it, and hence does not need to be dismantled, thus taking advantage of the previous economic investment made for storage.

Another advantage of the present invention is that it allows the compatibility of parts of the conventional compact "drive-in" palletisation storage structure with parts of storage with "flow-rail" sliding rails.

Another of the most important advantages to be noted is that the use of telescopic ribs enables its adaptation to a wide range of "drive-in" structures of different makes and sizes, dispensing with the need for custom adaptations.

In addition, a further added advantage is that the use of telescopic ribs allows better adaptation to the inside of the pallet beams.

It is also important to highlight that the structure of the telescopic ribs allows greater rigidity, which favours better inner fitting, affording the mesh greater resistance to deformation.

Another noteworthy aspect is that, as a consequence of the aforementioned, a lesser slant of the track is achieved and thus, less friction of the chain sides, which results in smoother operation of the sliding rail which avoids subsequent problems of wear or malfunctioning.

Finally, it is to be noted that the simplicity and modular nature of this adaptation means quicker and easier mounting, which results in a reduction of the economic cost of the adaptation.

DESCRIPTION OF THE FIGURES

To gain a better understanding of the object of this invention, a preferred practical embodiment of a supporting structure for sliding rail is shown in the drawing attached.

In the drawing, FIG.-1—shows a plan view and section view of the supporting structure for sliding rail.

PREFERRED EMBODIMENT OF THE INVENTION

The conformation and characteristics of the invention can be better understood in the following description that relates to the attached figures.

Figure 1:
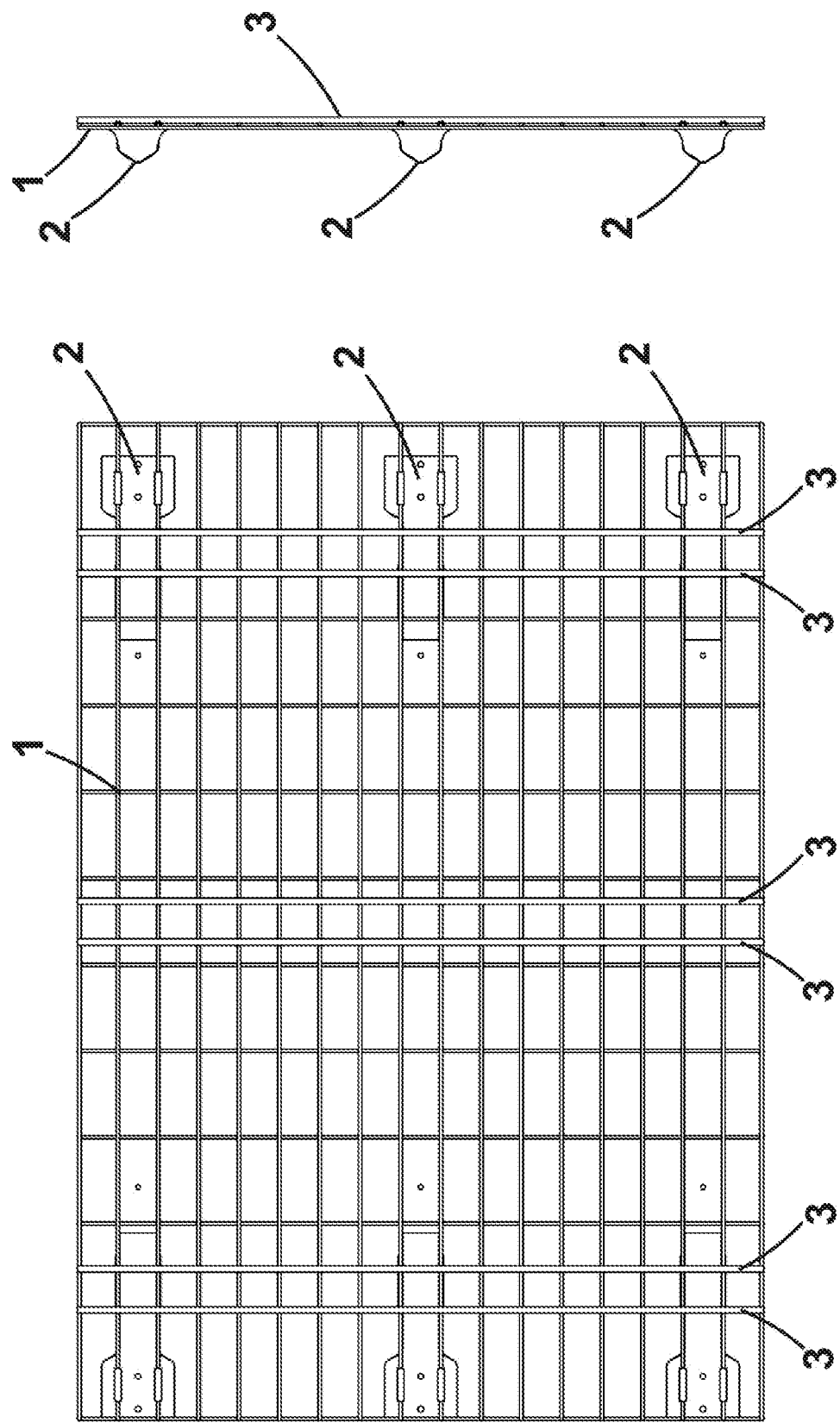

As can be seen in FIG. 1, the supporting structure for sliding rail is shown, indicating a mesh (1), with a quadrangular format, supported on several ribs (2), which has supporting rods (3) for the rails (15) on its upper part, on which subsequently a chain (16) will slide, the said rods (3) being arranged perpendicularly to the ribs and distributed in pairs.

Figure 2:
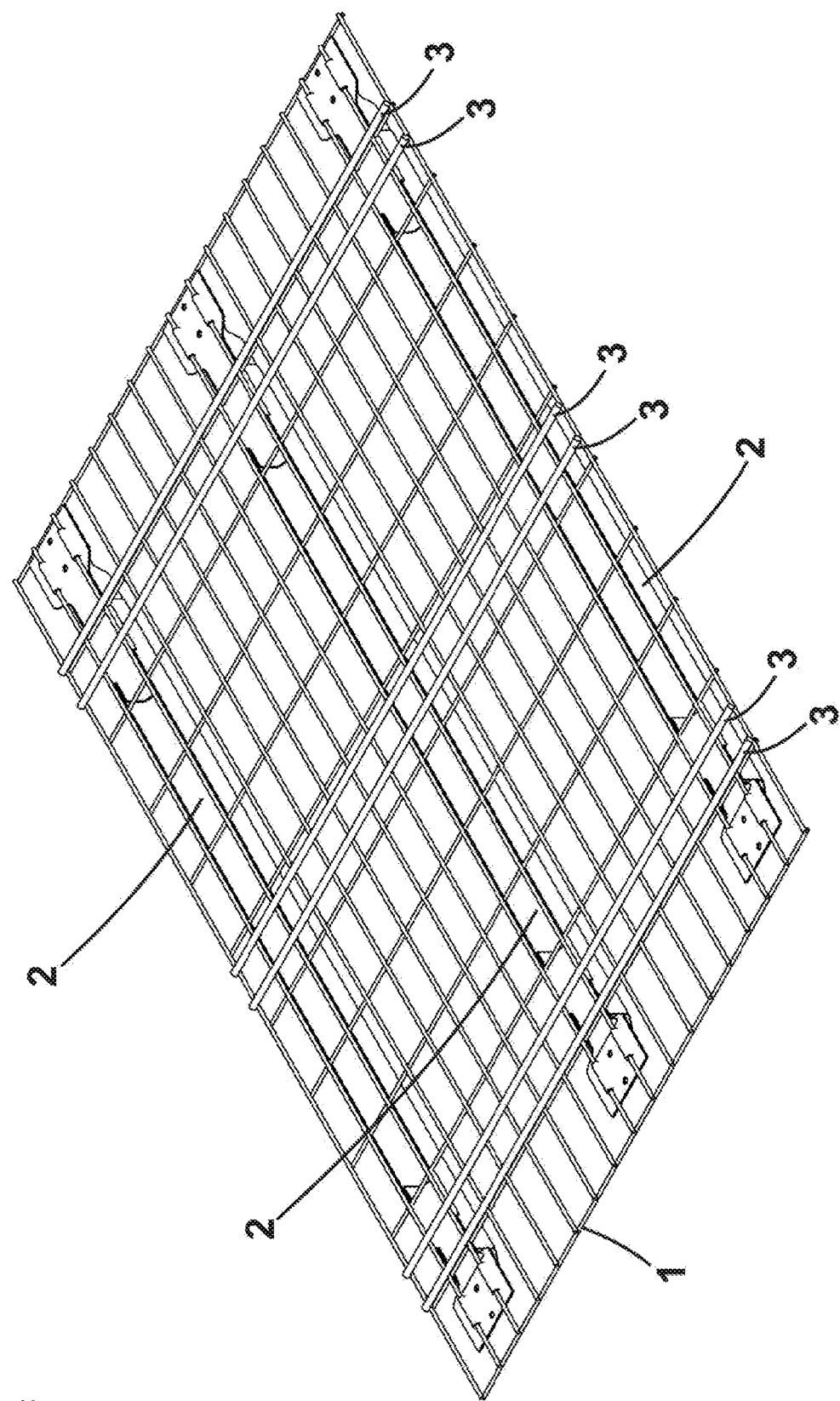
FIG.-2—shows a perspective view of the supporting structure for sliding rail.

The ribs (2) are fixed-length ribs (2a) or telescopic ribs (2b) of adjustable length, to adapt better to any type of conventional compact palletisation facility, FIG. 2 shows the supporting structure for sliding rail in perspective, indicating the mesh (1), with a quadrangular format, supported on several ribs (2), which has supporting rods (3) for the rails (15) on its upper part, on which subsequently a chain (16) will slide, the said supporting rods (3) being arranged perpendicularly to the ribs and distributed in pairs.

Figure 3:
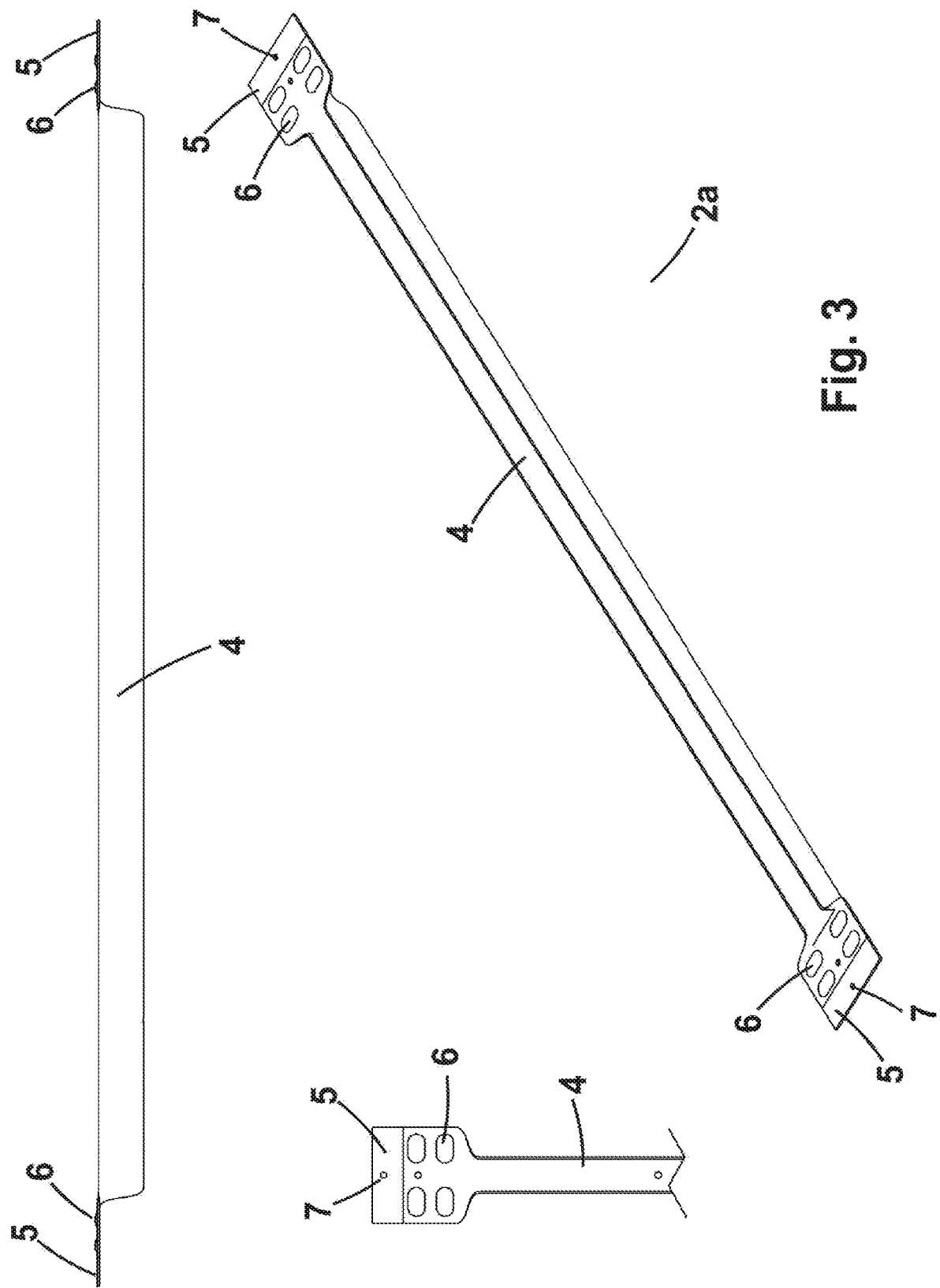
FIG.-3—shows a section, plan and perspective view of a fixed-length rib.
Figure 4:
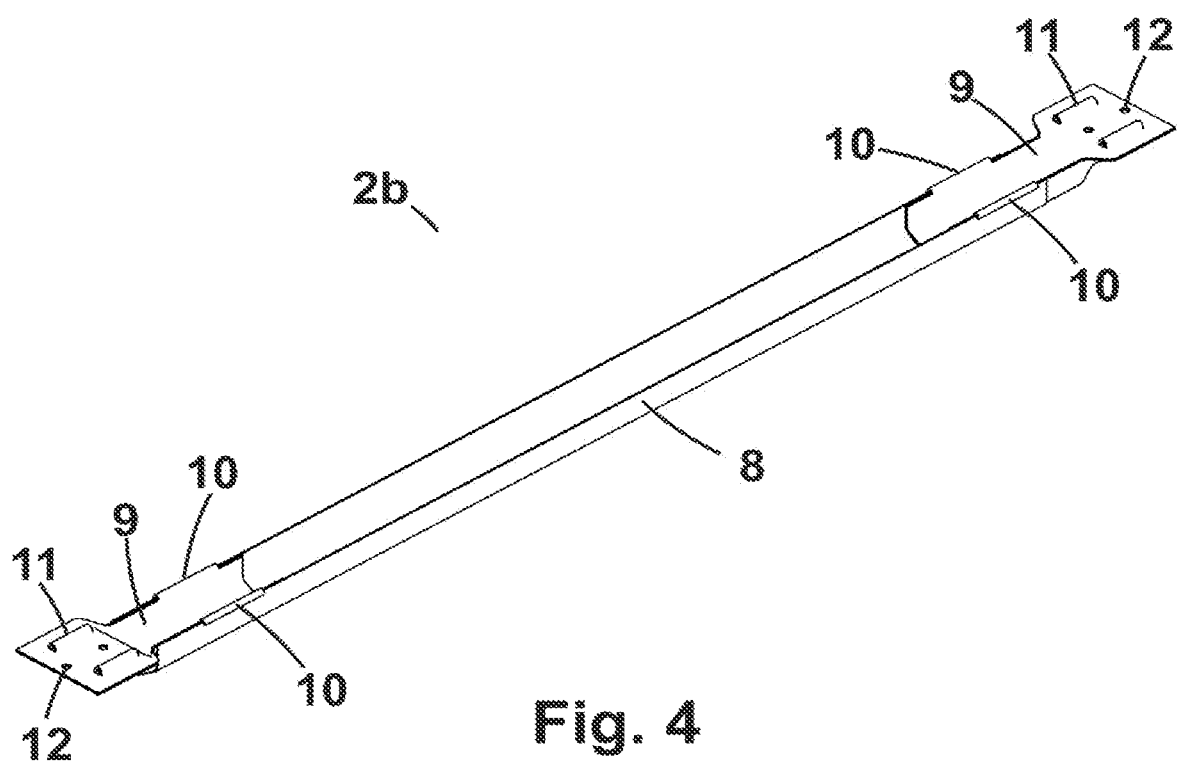
FIG.-4—shows a perspective view of a telescopic rib.
Figure 5:
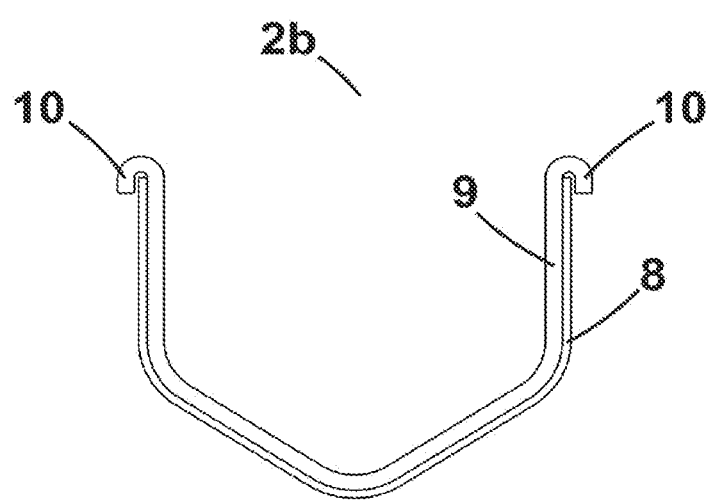
FIG.-5—shows a cross-section view of a construction detail of a telescopic rib.
Figure 6:
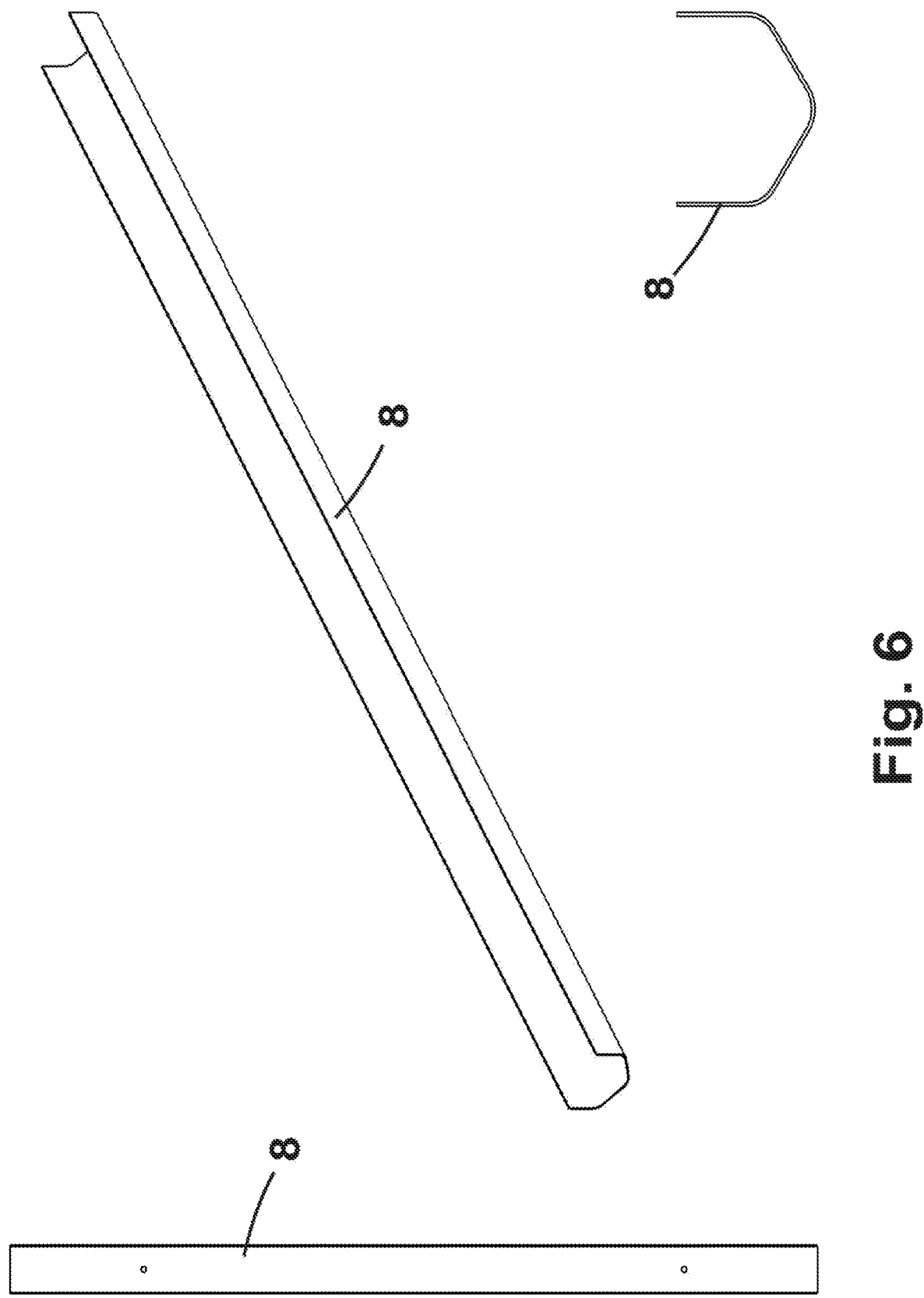
FIG.-6—shows a perspective, plan and cross-section view of the central body of a telescopic rib, FIG.-7—shows a front elevation, rear elevation, plan, section and perspective view of a terminal element of a telescopic rib.
Figure 7:
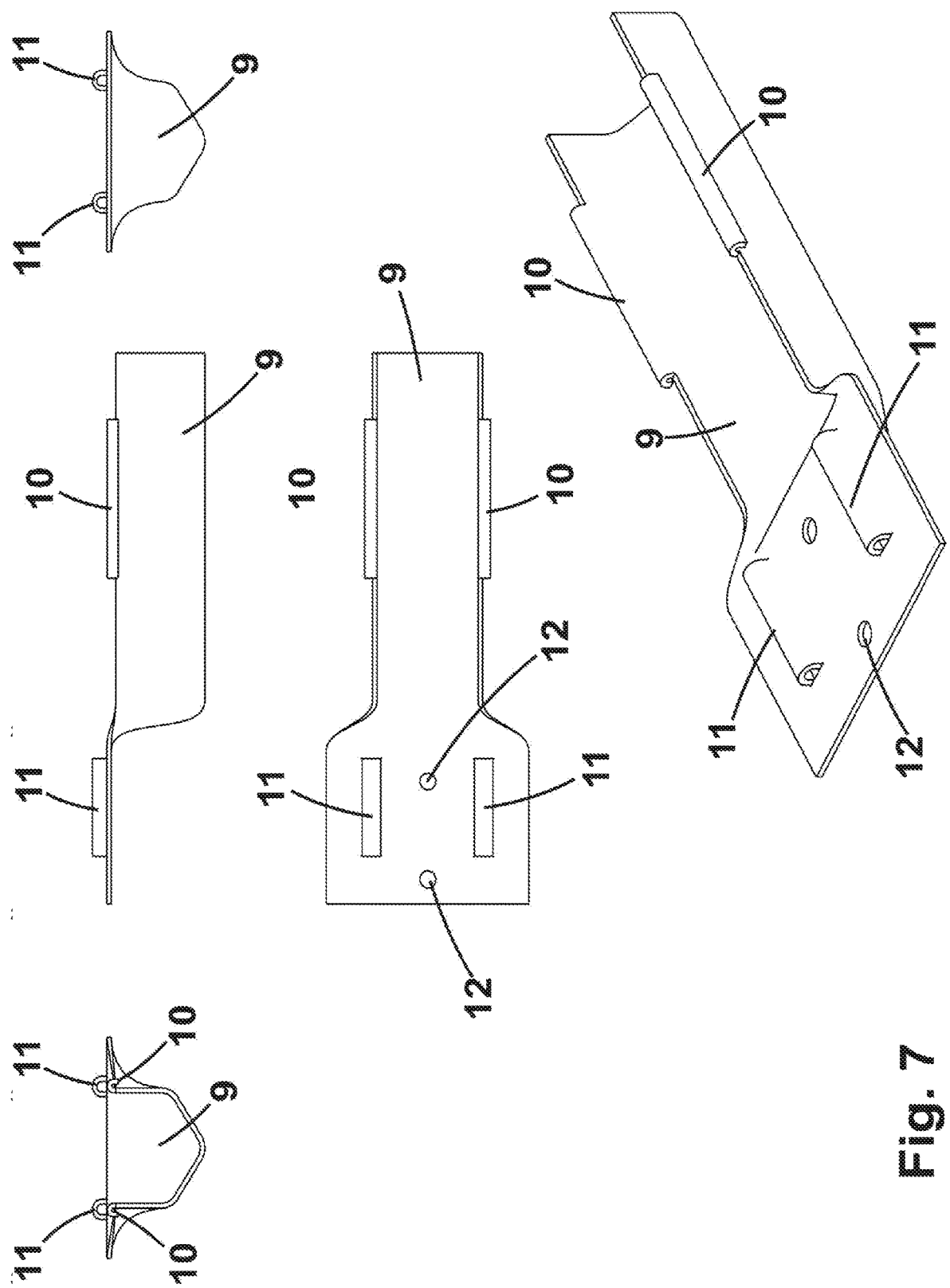

FIG. 3 shows the fixed-length ribs (2a), formed as a single piece, comprising a central element (4) of a notably greater length than the rest of the dimensions, finished at both ends with flat terminations (5). These flat terminations (5) have, in turn, several emerging protuberances (6) and one or several perforations (7).

The central element (4) is formed by a flat plate shaped as an open profile on its upper part. This open profile preferably has a section selected from the group formed by: U-shaped, V-shaped, semi-circular, shaped with two parts that run parallel to each other and two U-shaped parts, shaped with two parts that run parallel to each other and two V-shaped parts, or shaped with two parts that run parallel to each other and a semicircular part.

FIGS. 4 to 7 show the telescopic ribs (2b), indicating a central body (8) and two terminations (9) that can move longitudinally in relation to the said central body (8).

The terminations (9) of the telescopic ribs (2b) are shown, shaped as one single piece with a flat part and a part whose section coincides with the section of the central body (8), partially inserted into the said central body (8) and linked to it by means of at least two tabs (10) folded over the side walls of the central body (8). The terminations (9) also have, on their flat part, several emerging protuberances (11) and one or several perforations (12).

The central body (8) of the telescopic ribs (2b) is shown, formed by a flat plate shaped as an open profile on its upper part. This open profile preferably has a section selected from the group formed by: U-shaped, V-shaped, semicircular, shaped with two parts that run parallel to each other and two U-shaped parts, shaped with two parts that run parallel to each other and two V-shaped parts, or shaped with two parts that run parallel to each other and a semi-circular part.

Figure 8:
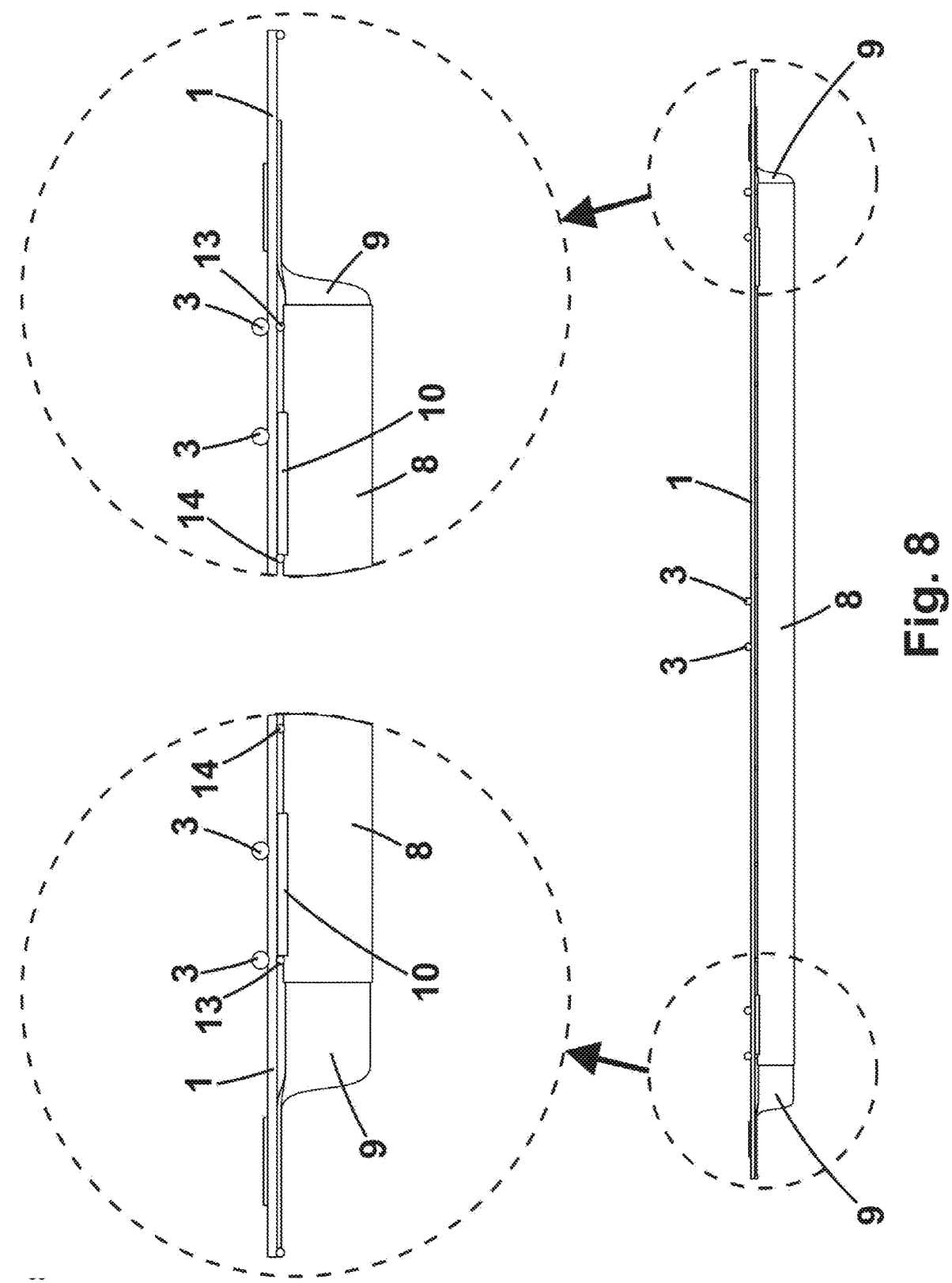
FIG.-8—shows a side view of the mesh and telescopic rib unit, with enlarged details of both ends.

FIG. 8 shows the telescopic ribs (2b) arranged in such a way under the mesh (1), that one of the supporting rods that forms it acts as an external travel stop (13), and another as an internal travel stop (14) for the tabs (10), and hence for the terminations (9) in their movement in relation to the central body (8).

Figure 9:
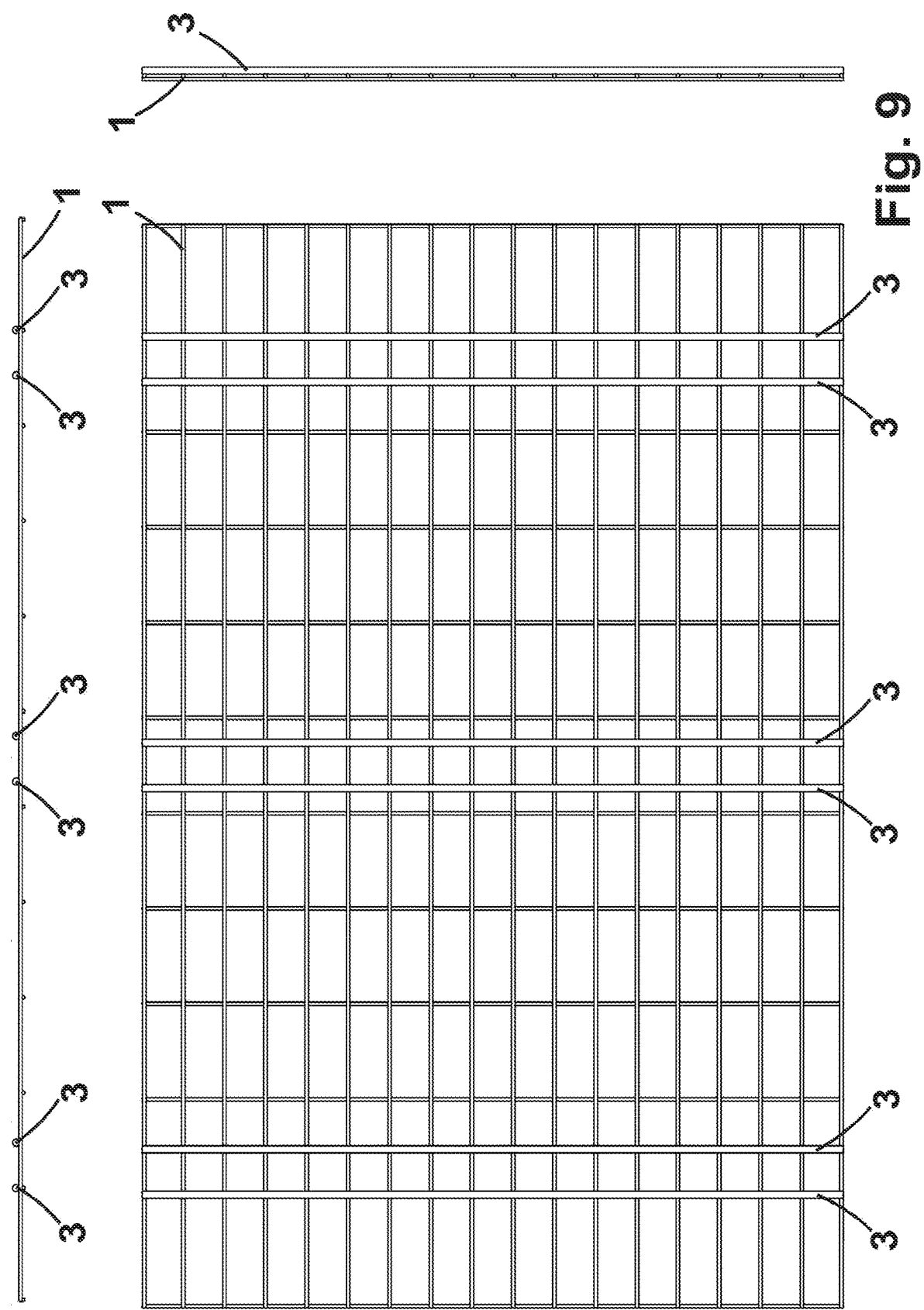
FIG.-9—shows an elevation, plan and section view of the mesh.
Figure 10:
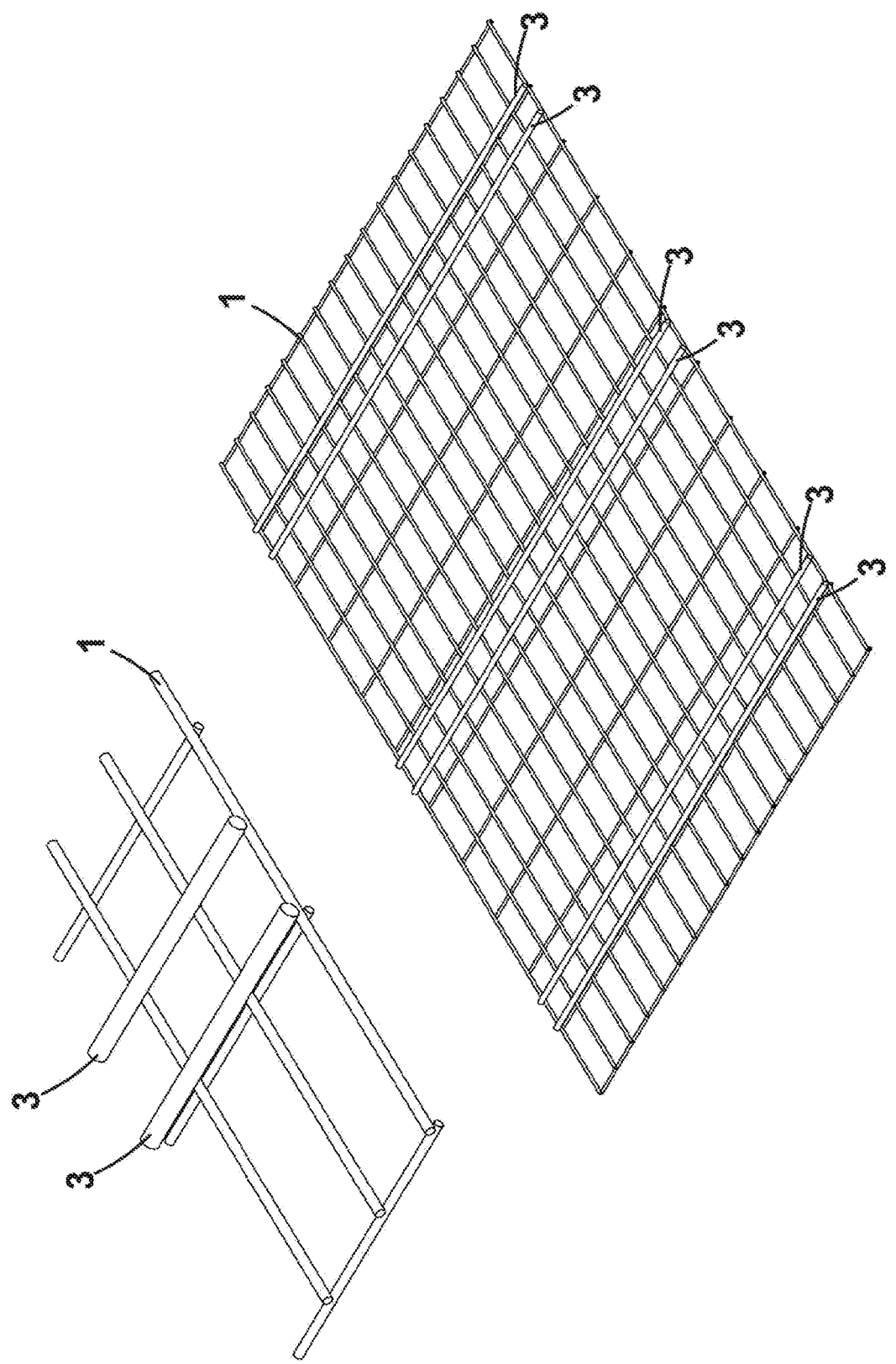
FIG.-10—shows a perspective view with an enlarged construction detail of the mesh.

FIGS. 9 and 10 show the mesh (1) shaped as a plurality of rods, some of which are support rods and some tie rods, arranged perpendicularly to the former and welded together forming a fixed unit. Preferably, the supporting rods (3) for the rails (15) have a larger diameter than the support and tie rods that form the mesh (1).

Figure 11:
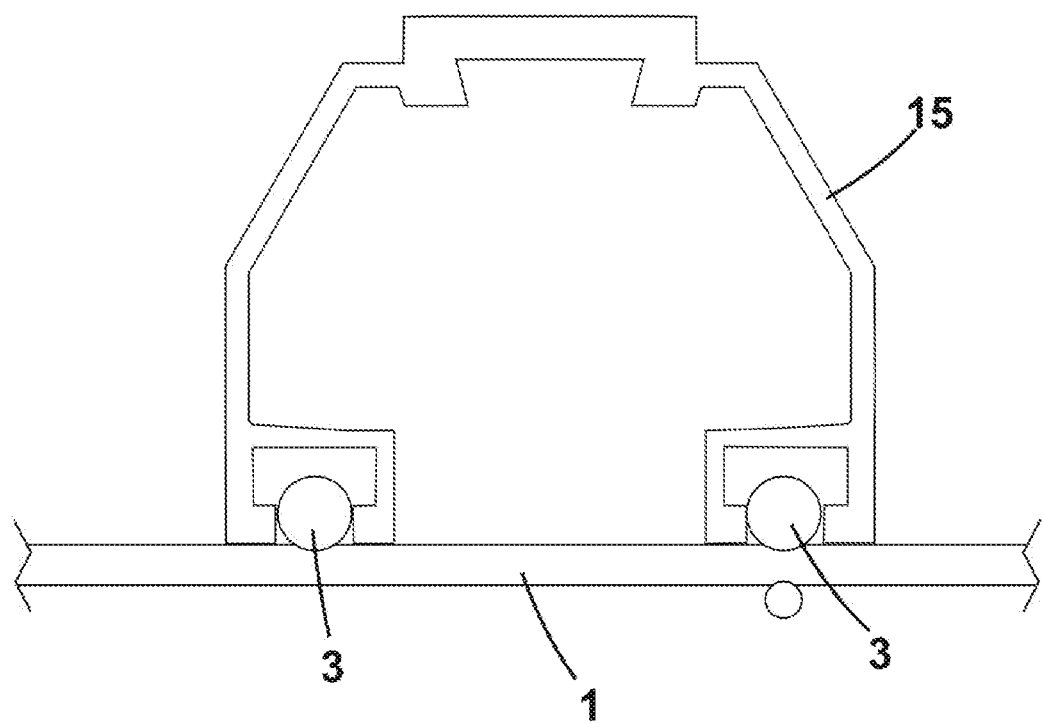
FIG.-11—shows a sectional view of a detail of the attachment of the rail for the chain on the supporting rods of the mesh.

FIG. 11 shows the attachment of the rail (15) for the chain (16) coupled onto the supporting rods (3) of the mesh (1).

Figure 12:
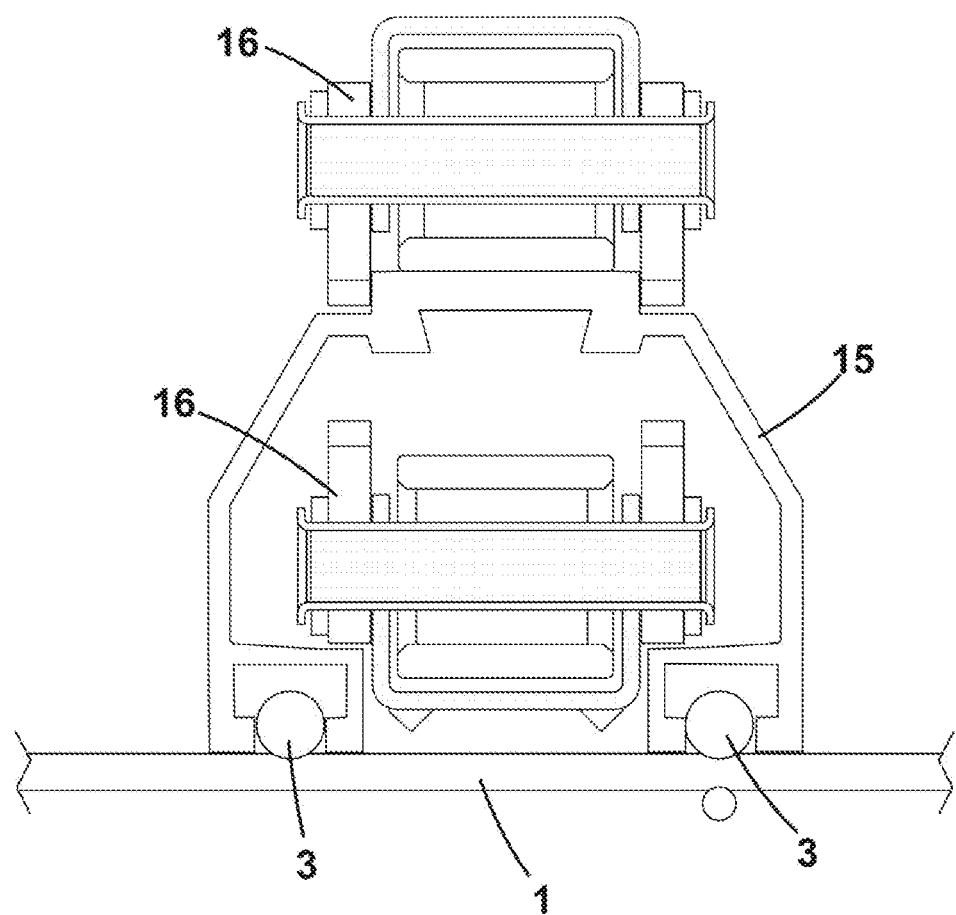
FIG.-12—shows a sectional view of a detail of the attachment of the rail for the chain, together with the chain itself, on the supporting rods of the mesh.

FIG. 12 shows a detail of the attachment of the rail (15) for the chain (16), together with the chain (16) itself, on the supporting rods (3) of the mesh (1).

A person skilled in the art will easily comprehend that the characteristics of different embodiments can be combined with the characteristics of other possible embodiments, provided that the combination is technically possible.

The invention claimed is:

1. Supporting structure for a sliding rail, characterized in that the supporting structure comprises one or several identical modules, stacked longitudinally, each of which in turn comprises:
- a mesh (1) with a quadrangular format and shaped as a plurality of support rods arranged perpendicularly and welded together forming a fixed unit, which has, on an upper part, supporting rods (3) of a larger diameter than the support rods, for rails (15) on which subsequently a chain (16) is slidable, the supporting rods (3) being distributed in pairs; and
- ribs (2) on which the mesh (1) is supported, the ribs (2) being telescopic ribs (2b) of adjustable length, the ribs (2) being arranged perpendicularly in relation to the supporting rods (3) of the mesh (1);
- wherein the telescopic ribs (2b) comprise a central body (8) and two terminations (9) that can move longitudinally in relation to the central body (8), and
- wherein the telescopic ribs (2b) are arranged in such a way under the mesh (1); that one of the supporting rods acts as an external travel stop (13), and another of the supporting rods as an internal travel stop (14) for tabs (10), and hence for the terminations (9) in movement in relation to the central body (8).

2. Supporting structure for sliding rail, according to claim 1, wherein the central body (8) is formed by a flat plate, shaped as an open profile on an upper part.

3. Supporting structure for sliding rail, according to claim 1, wherein the central body (8) is formed by a flat plate shaped as an open profile with a section selected from the group formed by: U-shaped, V-shaped, semicircular, shaped with two parts that run parallel to each other and two U-shaped parts, shaped with two parts that run parallel to each other and two V-shaped parts, or shaped with two parts that run parallel to each other and a semicircular part.

4. Supporting structure for sliding rail, according to claim 1, wherein the terminations (9) are shaped as one single piece with a flat part and a part whose section coincides with the section of the central body (8), partially inserted into the central body (8) and linked to the central body by means of at least two of the tabs (10) folded over side walls of the central body (8).

5. Supporting structure for sliding rail, according to claim 1, wherein the terminations (9) have, on a flat part, several emerging protuberances (11) and one or several perforations (12).

* * * * *